United States Patent [19]
Hachey et al.

[11] Patent Number: 5,571,362
[45] Date of Patent: Nov. 5, 1996

[54] METHOD FOR MAKING RETROREFLECTIVE ARTICLE WITH DUAL REFLECTORS

[75] Inventors: Kathleen A. Hachey, Hudson, Wis.; Thomas P. Hedblom, Eagan, Minn.; David C. May, Roberts, Wis.

[73] Assignee: Minnesota Mining And Manufacturing Company, St. Paul, Minn.

[21] Appl. No.: 418,514

[22] Filed: Apr. 7, 1995

Related U.S. Application Data

[62] Division of Ser. No. 247,056, May 20, 1994, Pat. No. 5,417,515.

[51] Int. Cl.$^6$ .............................. B05D 5/06; B32B 21/00
[52] U.S. Cl. ................. 156/264; 156/256; 156/276; 427/163.4; 427/199; 427/204; 427/289; 427/385.5; 427/407.1
[58] Field of Search .................... 427/163.4, 199, 427/204, 385.5, 407.1, 289; 156/256, 264, 276

[56] References Cited

U.S. PATENT DOCUMENTS

| | | | |
|---|---|---|---|
| 2,379,741 | 7/1945 | Palmquist | 88/82 |
| 2,407,680 | 9/1946 | Palmquist et al. | 88/82 |
| 2,567,233 | 9/1951 | Palmquist et al. | 88/82 |
| 3,005,382 | 10/1961 | Weber | 88/82 |
| 3,190,178 | 6/1965 | McKenzie | 88/82 |
| 3,418,896 | 12/1968 | Rideout | 94/1.5 |
| 3,614,199 | 10/1971 | Altman | 359/540 |
| 3,700,305 | 10/1972 | Bingham | 350/105 |
| 3,758,192 | 9/1973 | Bingham | 359/540 X |
| 3,832,038 | 8/1974 | Johnson | 359/534 X |
| 4,145,112 | 3/1979 | Crone et al. | 404/14 K |
| 4,265,937 | 5/1981 | Kameya et al. | 427/163.4 |
| 4,505,967 | 3/1985 | Bailey | 427/163.4 |
| 4,564,556 | 1/1986 | Lange | 428/325 |
| 4,721,649 | 1/1988 | Belisle et al. | 428/325 |
| 4,763,985 | 8/1988 | Bingham | 359/536 X |
| 4,957,335 | 9/1990 | Kuney, Jr. | 359/541 |
| 4,988,555 | 1/1991 | Hedblom | 428/172 |
| 5,227,221 | 7/1993 | Hedblom | 404/14 K |
| 5,268,789 | 12/1993 | Bradshaw | 359/534 |

OTHER PUBLICATIONS

James, "A Note on the Principles of Reflectorised Road-Marking Materhails", *Roads and Road Construction*, vol. 38, No. 448, Apr. 1960, pp. 122–123.

Stoudt, "Retroreflection from Special Spherical Glass Beads In Highway Pavement Markings, 1: Specular reflection", *Applied Optics*, vol. 17, No. 12, Jun. 1978, pp. 1855–1858.

*Primary Examiner*—Janyce Bell
*Attorney, Agent, or Firm*—Gary L. Griswold; Walter N. Kirn; Robert H. Jordan

[57] ABSTRACT

A retroreflective article and a method for making same are taught. The retroreflective article comprises transparent microspheres and both specular and diffuse reflective pigments dispersed in a binder layer. The utilization of both types of pigments results in improved retroreflectivity over a greater range of entrance angles than if only one or the other pigment alone were used.

12 Claims, 7 Drawing Sheets

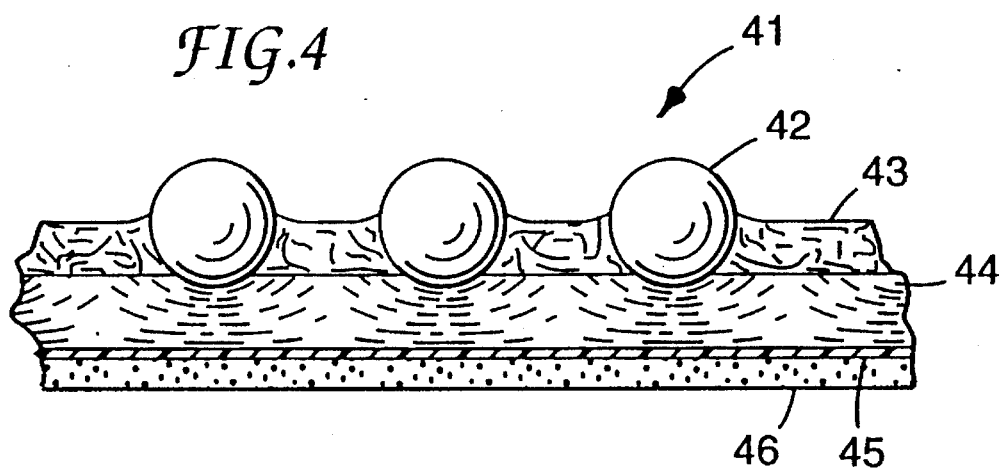
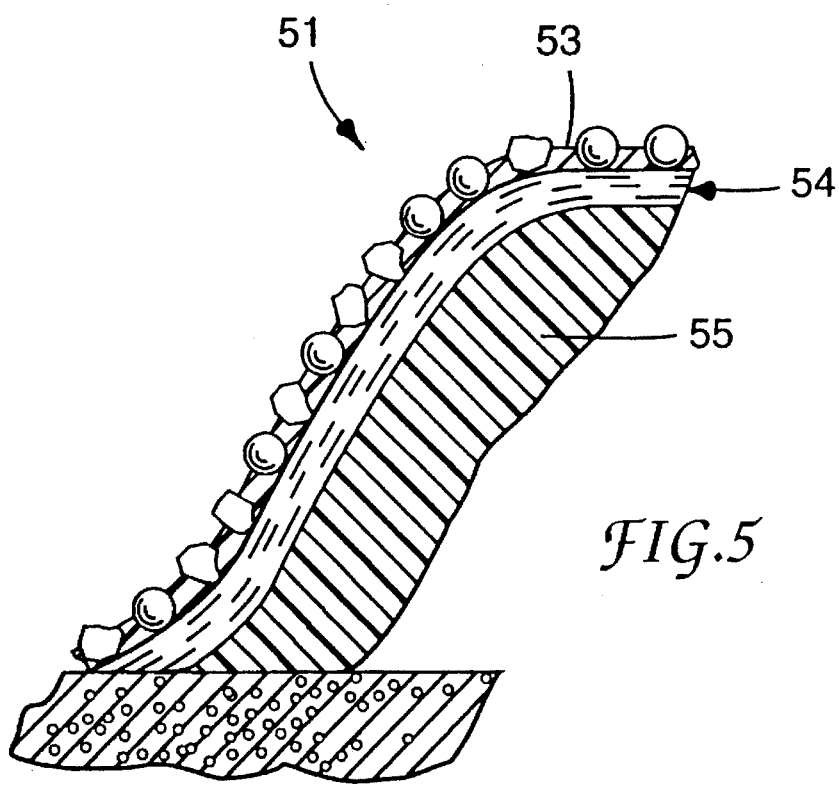

METHOD FOR MAKING RETROREFLECTIVE ARTICLE WITH DUAL REFLECTORS

CROSS-REFERENCE TO RELATED APPLICATIONS

This application is a divisional of U.S. application Ser. No. 08/247,056 filed May 20, 1994, now U.S. Pat. No. 5,417,515.

FIELD OF INVENTION

The present invention relates to a retroreflective article and a method for making that article. In particular, the invention relates to a retroreflective article with both specular and diffuse reflective pigments to provide high levels of reflectivity over a wide range of entrance angles. In particular, the invention relates to a retroreflective article such as a patterned pavement marking.

BACKGROUND

Pavement markings, such as those on the centerline and edgeline of the roadway are important in order to provide visual guidance for motor vehicle drivers. It is important for a driver to be able to see the pavement markings from a distance as well as from up close.

Currently, pavement markings typically rely on an optical system comprising transparent microspheres partially embedded in a binder layer containing diffusely reflective pigment particles such as those of titanium dioxide ($TiO_2$) or lead chromate ($PbCrO_4$) as reflectors. The microspheres are dropped onto a liquid coating that contains the diffusely reflective pigment. In use, light from the headlamp of a vehicle enters the microsphere and is refracted below to fall on a diffusely reflective pigment. Some portion of the light is returned generally along the original entrance path in the direction of the vehicle so as to be visible to the driver. (see FIG. 1)

The use of a mirror type (specular) reflector, e.g., a layer of aluminum or silver, to improve efficiency has long been understood but is practical only when orientation of the reflector-coated microsphere and light source is possible, that is, when the incident light strikes the microsphere near normal, as with a vertical sign. (see FIG. 2) In almost all commercial retroreflective constructions having a sheet form the specularly reflective material is a metal, i.e., a vacuum-deposited layer of specularly reflective aluminum arranged behind the microsphere, as taught in U.S. Pat. No. 3,005,382 (Weber) or U.S. Pat. No. 3,190,178 (McKenzie), or spaced from the microspheres by a spacing layer as taught in U.S. Pat. No. 2,407,680 (Palmquist et al.). Alternatively, specularly reflecting metal flakes can be contained in the binder, as disclosed in U.S. Pat. No. 2,567,233 (Palmquist et al.).

U.S. Pat. No. 3,418,896 (Rideout) teaches the use of retroreflective elements comprised of glass spheres applied to a pigmented plastic rod which is then chopped into segments. The segments are dropped onto a paint to form a pavement marking. The paint onto which the segments are dropped and into which the segments become embedded may be pigmented for example with titanium dioxide.

Currently available pavement markings work effectively for only a limited range of distances and entrance angles. For example, flat pavement markings, which rely on diffuse pigments, are most easily seen at distances of approximately 80 meters and less. At distances greater than this, the optical efficiency drops off due to the relatively larger entrance angles of the incident light. Patterned pavement markings with vertical components which utilize specular pigments are more effective at the longer distances, acting more like a vertical sign.

The present invention provides a retroreflective article that is useful over a wide range of distances and entrance angles (see FIG. 3) regardless of the orientation of the reflector.

SUMMARY OF THE INVENTION

In brief summary, the invention provides a retroreflective article comprising an array of microspheres partially embedded in and protruding from the outer surface of a binder layer, wherein the binder layer comprises a first layer and a second layer. The second layer underlies the first layer. The first layer comprises particles of a diffuse reflector pigment, and the second layer comprises particles of a specular reflector pigment, the microspheres being embedded in said binder layer so as to extend through said first layer and become partially embedded in the second layer, as defined below.

This invention has greatly improved retroreflectivity at entrance angles common to roadway delineation and has greater durability than comparable constructions not employing ceramic beads.

The two layers of the binder layer provide for high levels of retroreflectivity over a wide range of distances and entrance angles regardless of the orientation of the retroreflective element. This is because the two layers include a specular reflective layer, and a diffuse reflective layer. The specular reflective layer is best suited for returning light which enters close to normal, while the diffuse layer is best suited for returning light at the larger entrance angles between 65° and 90° from normal with respect to the plane formed by the binder material in contact with the microsphere. This invention provides higher efficiency in profiled or contoured pavement markings, where a substantially vertical component is present. In a flat pavement marking all entrance angles are high; however, a rough road surface may provide a sufficient element of verticality to even a flat pavement marking tape.

The article of the invention will find utility in any embodiment having a vertical component. While the preferred embodiment is a patterned pavement marking, the invention also has utility anywhere there are both relatively high and low entrance angles of incident light, i.e., a vehicle marking. For example, a flat sheet (see FIG. 4) of the invention may be wrapped around or applied to a 2 dimensional or 3 dimensional structure to achieve the vertical component. Alternately, chopped segments of a retroreflective element of the invention may be placed onto a flat tape to provide the vertical component.

BRIEF DESCRIPTION OF THE DRAWINGS

The invention will be further explained with reference to the drawing, wherein.

3

Figure 3:
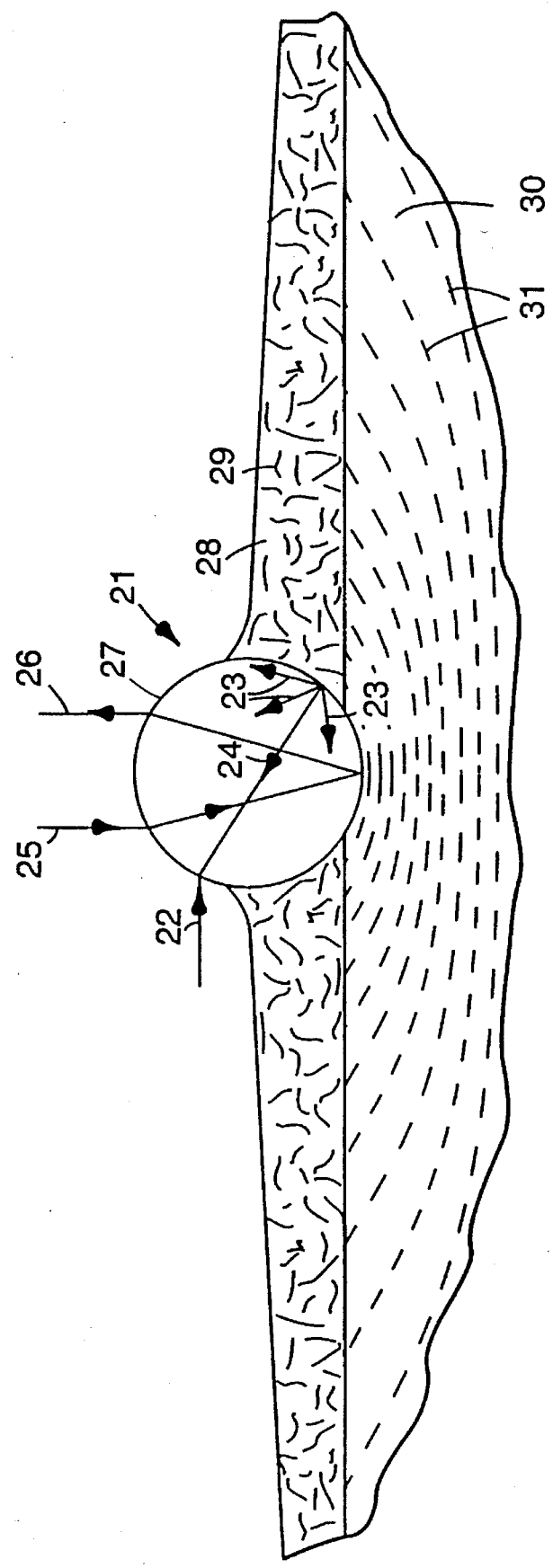

FIG. 3 is a schematic diagram of a retroreflective element of the invention, with both diffusely and specularly reflective pigments.

FIG. 4 is a cross-sectional view of the retroreflective article of the invention, in a horizontal configuration.

FIG. 5 is a detailed cross-sectional view of a retroreflective article of the invention, demonstrating the vertical component due to the invention's placement on a structured surface such as the embossed protrusion of a patterned pavement marking.

Figure 6:
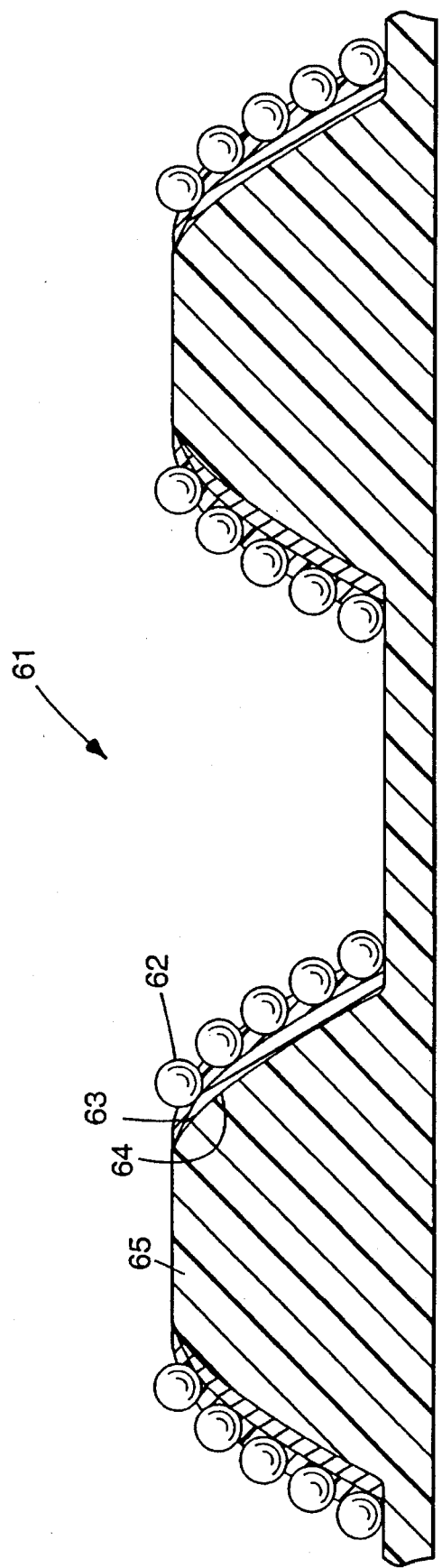

FIG. 6 is a cross-sectional view of a pavement marking embodiment of the invention, displaying the vertical component due to the patterned protrusions of the pavement marking.

Figure 7A:
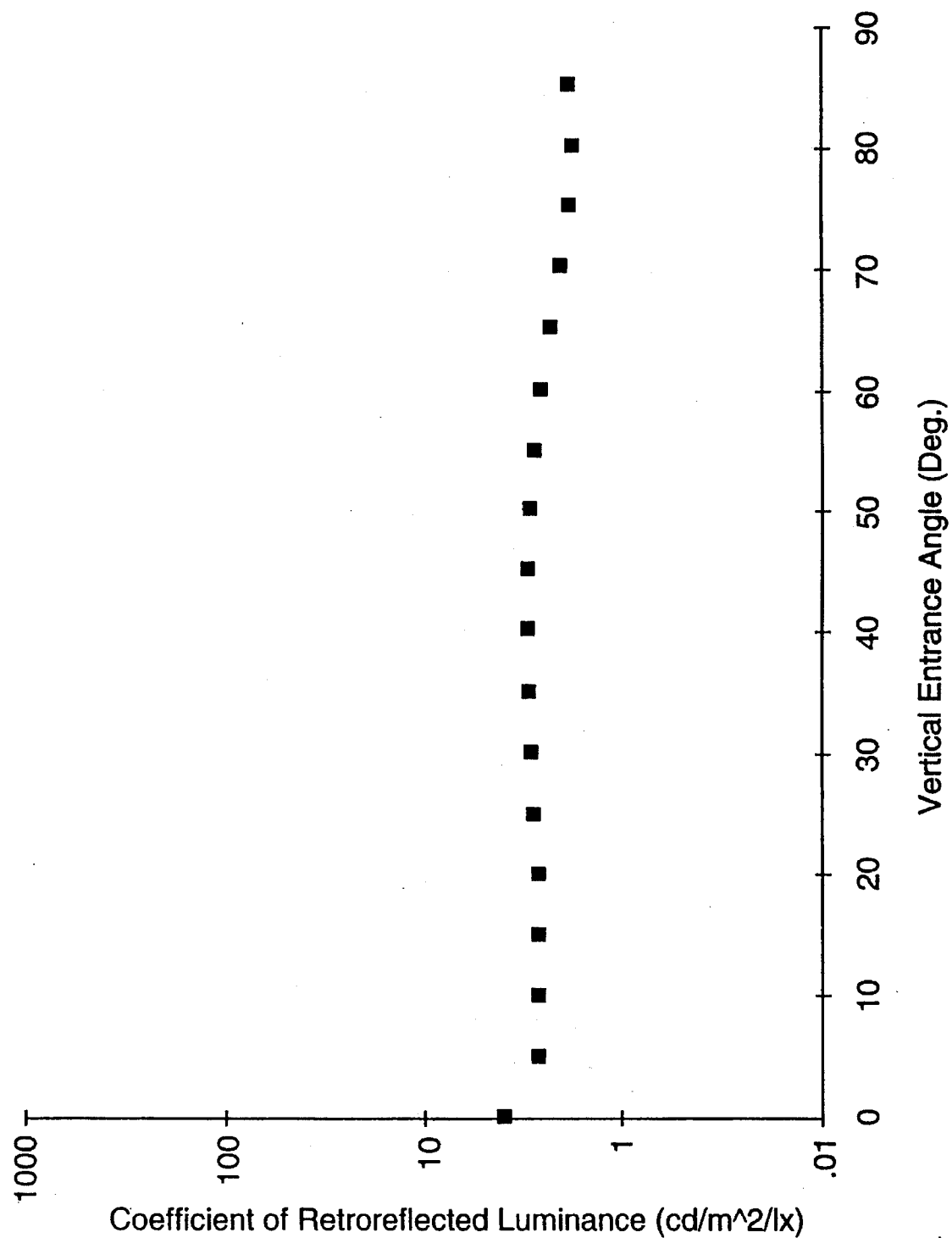
Figure 7B:
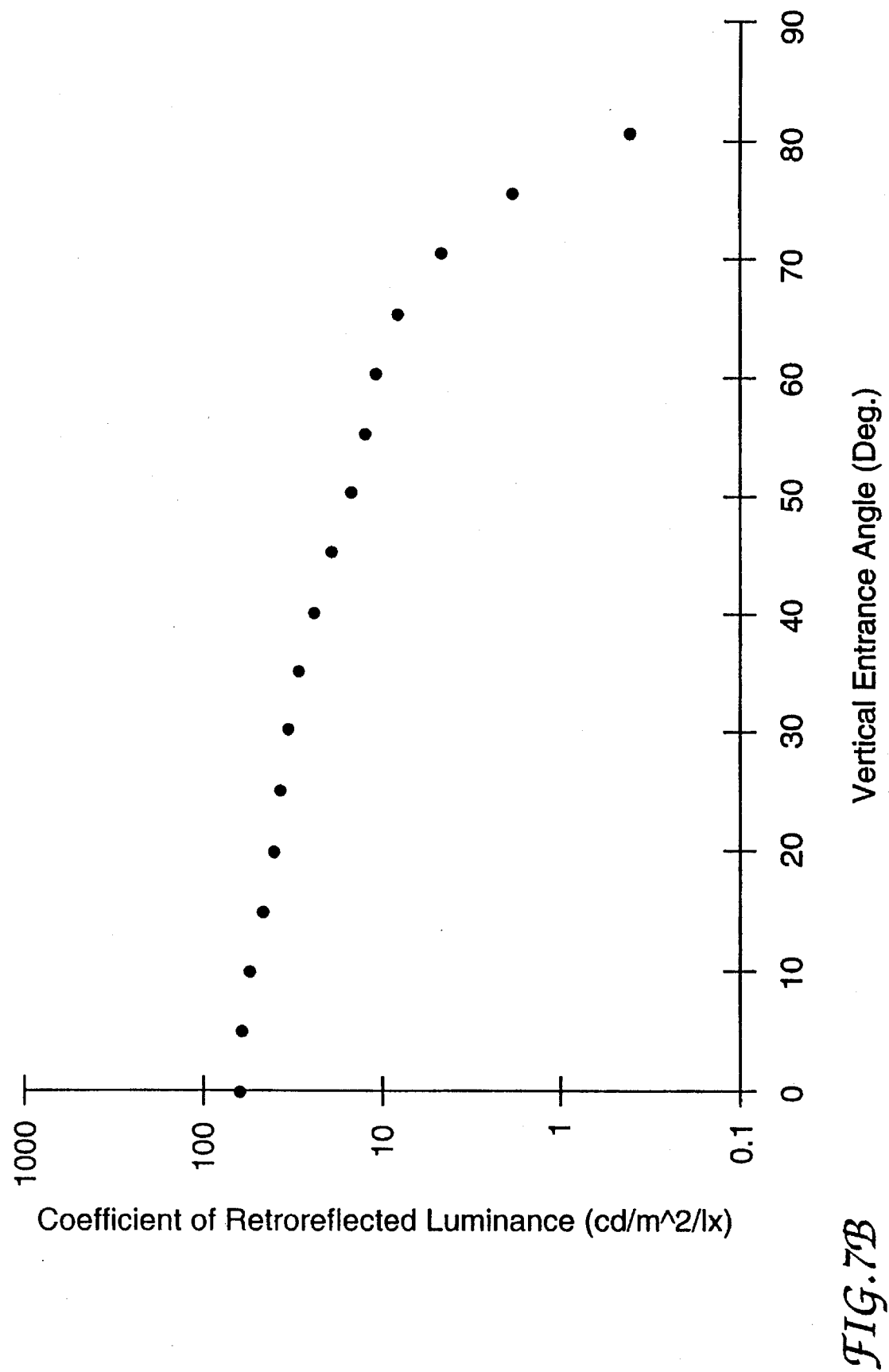
Figure 7C:
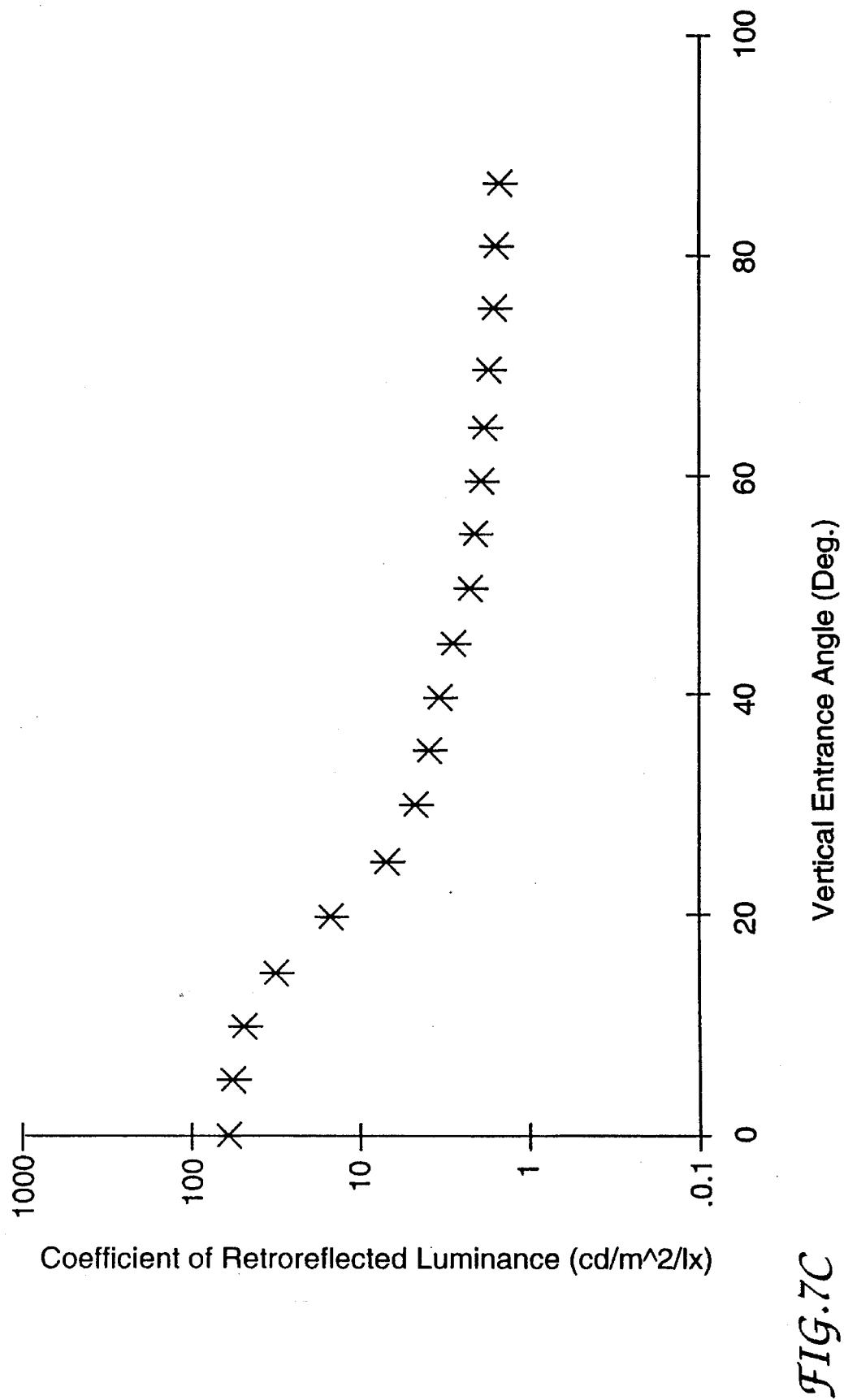

FIG. 7 depicts graphs of reflectivity for diffuse reflectors, specular reflectors, and dual reflectors. (7A, 7B, and 7C respectively)

These figures, which are idealized and not to scale, are intended to be merely illustrative and non-limiting.

DETAILED DESCRIPTION OF ILLUSTRATIVE EMBODIMENTS

As mentioned above, the invention provides a retroreflective article comprising an array of microspheres partially embedded in and protruding from the outer surface of a binder layer, wherein said binder layer comprises a first layer and a second layer, said second layer underlying said first layer, said first layer comprising a diffuse reflector pigment, said second layer comprising a specular reflector pigment, said microspheres being embedded in said binder layer so as to extend through said first layer and become partially embedded in said second layer.

The second layer of the binder layer, which underlies the first layer, comprises a specular reflecting pigment. The first layer comprises a diffuse reflecting pigment. The thickness of the first layer of the binder layer is usually greater than the thickness of the second layer. The two layers of the binder layer can be coated in any suitable manner, i.e., out of solvent or from a 100 percent solids mixture. The binder layer may optionally be coated onto a film of any suitable type. The film may become a permanent part of the article or the binder coating may be removed and placed onto another structure. Alternatively, the binder layer may be an integral part of an already formed article into which microspheres are subsequently sunk, or the binder layer may be coated onto a rod or core into which microspheres are then sunk before the binder layers are cured or hardened. Because of the inclusion of both types of reflective pigments in the retroreflective article of the invention, reflectivity will be higher over a greater range of entrance angles than if only one or the other pigment alone was used. (See FIGS. 7A, 7B, and 7C, where 7A is the diffuse reflector, 7B is the specular reflector, and 7C is the dual layer reflector of the invention.)

Because this invention utilizes both specularly and diffusely reflecting pigments, it has greatly improved retroreflectivity across the range of entrance angles encountered in driving compared to previous constructions. While the invention may utilize either glass or ceramic microspheres, the invention may be made more durable by the use of ceramic microspheres. Ceramic microspheres are preferred over glass microspheres. The advantages that can be attained with ceramic microspheres are known to those skilled in the art.

Diffuse pigments are generally fine particles which are relatively uniform in size. In diffuse pigments the reflectors tend to be oriented in many different directions, so that light hitting the diffuse pigment particles is reflected back at a number of angles, including back along the path of incident light. An example of a preferred diffuse pigment is titanium dioxide.

Figure 1:
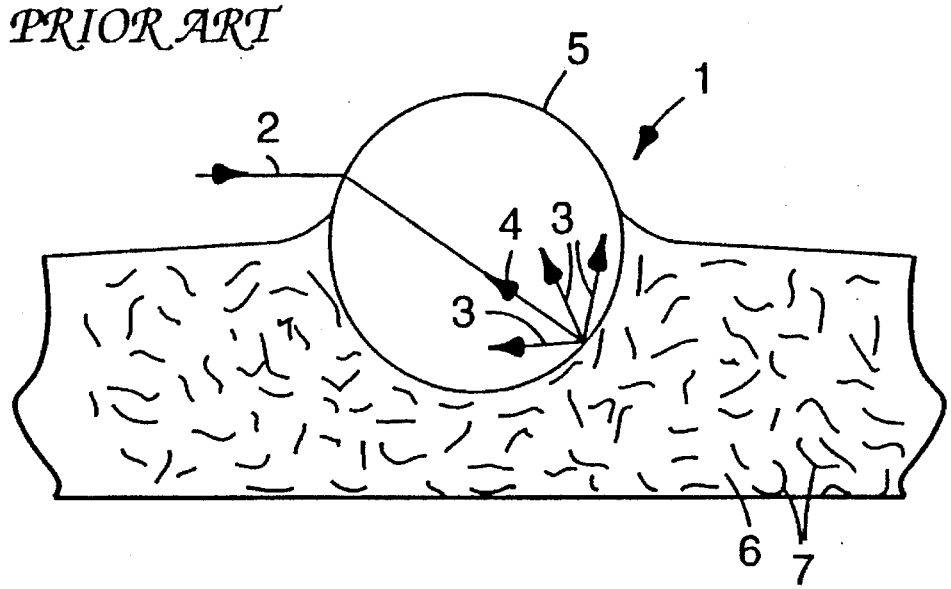
FIG. 1 is a schematic diagram of a conventional diffusely reflecting retroreflective element.

FIG. 1 is a schematic diagram of a conventional retroreflecting element 1 with diffuse reflecting pigments, where 2 is an incident light ray, 3 are the light rays reflected at various angles, 4 is the light ray reflected back in the direction of the source, 5 is the microsphere, 6 is the microsphere binder containing particles of diffusive reflective pigment, and 7 is a particle of diffuse reflective pigment. When the light ray 2 enters the microsphere 5 the ray is refracted. When the refracted light hits the binder 6 containing diffusely reflective pigment particles 7, the light is reflected back at a variety of angles 3. Only a portion of the light is reflected back along the path at which it came in (light ray 4) so as to be retroreflected toward the light source.

Specular pigments are generally thin and plate-like. In specular pigments the reflectors tend to be oriented parallel, so that light hitting the specular pigment particles is reflected at an angle equal but opposite to, that is, at a mirror image from normal, of the angle at which it entered. An example of a preferred specular pigment is leafing aluminum. Other specular pigments which may also exhibit this leafing characteristic could also be used, including mica, nacreous and pearlescent pigments. Leafing pigment flakes are large and thin flakes that tend to align themselves parallel to the web or surface onto which they have been coated. When the microsphere is dropped onto and indents the coating medium, the material at the bottom of the microsphere has the most compression and tends to pull the pigment flakes down with it. The effect is that the pigment flakes tend to line up around the embedded portion of the bead like a coating. This tendency of the flakes to line up to effectively coat the microsphere improves the specular reflecting efficiency.

Figure 2:
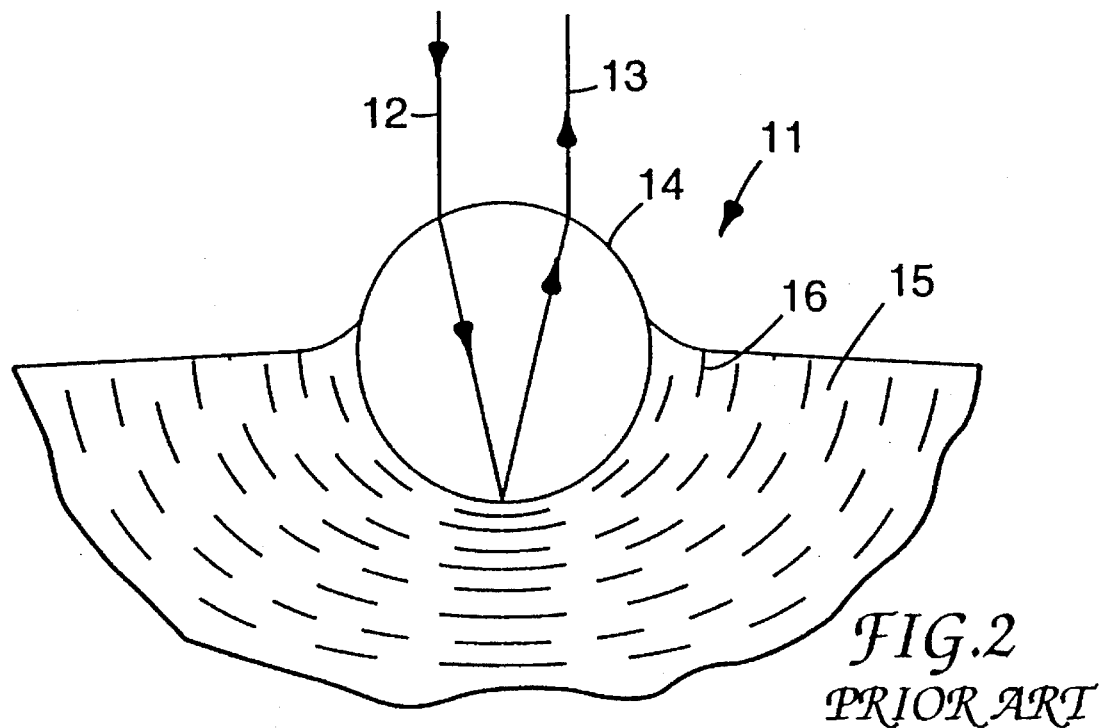
FIG. 2 is a schematic diagram of a conventional specularly reflecting retroreflective element.

FIG. 2 is a schematic diagram of a conventional retroreflective element 11 with specular reflecting pigments, where 12 is an incident light ray, 13 is a reflected light ray, 14 is the microsphere, 15 is the microsphere binder containing particles of specular reflective pigment, and 16 is a particle of specular reflective pigment. When the light ray 12 enters the microsphere 14 the ray is refracted. When the refracted light hits the binder 15 containing specularly reflective pigment particles 16, the light ray 13 is reflected back at a mirror image from normal of the angle at which it entered. This is much more efficient than diffuse reflectance, but is practical only when the lens and light source are generally oriented so that light strikes the surfaces at angles between 0 and about 65 degrees from normal.

FIG. 3 is a schematic diagram of the retroreflective element of the invention, a retroreflective element 21 with both diffuse and specular reflecting pigments, where 22 is a ray of incident light at a high entrance angle, 23 are rays of light reflected back at various angles, 24 is a light ray reflected back in the direction of the source, 25 is a ray of incident light at a low entrance angle, 26 is a light ray reflected back in the direction of the source, 27 is a microsphere, 28 is the layer of microsphere binder containing particles of diffuse reflective pigment, 29 is a particle of a diffuse reflective pigment, 30 is the layer of microsphere binder containing particles of specular reflective pigment, and 31 is a particle of a specular reflective pigment. An incident ray of light 22 enters the microsphere 27 at a high entrance angle, for example greater than 85 degrees, the ray is then refracted to strike the binder 28 containing diffusely reflecting pigment particles 29 and the light is reflected back at a variety of angles 23. Only a portion of the light is reflected back along the same path at which it came in (light ray 24) so as to be retroreflected toward the light source. An incident ray of light 25 enters the microsphere 27 close to normal. The ray is then refracted. The refracted light strikes the binder 30 containing the specularly reflecting pigment particles 31, so light ray 26 is returned at a mirror image from normal of the angle at which it entered. With an element of verticality present, such as in a patterned pavement marking or a flat pavement marking tape applied to a contoured surface, incident light will strike some of the microspheres closer to normal with respect to the plane of the binder layer in contact with the microsphere, and so will be reflected by the specularly reflecting layer. (See FIG. 5 wherein 51 is an embodiment of the invention, 53 is the binder layer containing the diffusely reflective pigment, 54 is the binder layer containing the specularly reflective pigment and 55 is a surface with an element of verticality.) The incident light will strike other microspheres on the vertical component at larger entrance angles, so the light will be reflected by the diffusely reflecting layer behind these other microspheres, and thus this material will be effective over a larger range of entrance angles.

The microspheres can be of any suitable material to refract light. Ceramic microspheres are preferred for use in the invention. The ceramic microspheres are of greater durability than glass microspheres and therefore of greater utility in actual use. U.S. Pat. No. 4,564,556 (Lange) teaches the making of ceramic microspheres. The microspheres preferably have a refractive index greater than 1.5. More preferably, the refractive index is greater than 1.7, and most preferably about 1.93, although microspheres with indexes of refraction higher than this may also be used. The optimum index of refraction of the microspheres will depend upon other factors in the system, such as pigment type and loading. It is important that the microspheres be of sufficiently high index of refraction in order to refract the light ray enough that it falls onto a portion of the bead in contact with binder material so that retroreflection can take place. It is also possible to use a mixture of microspheres with refractive index of 1.93, and microspheres with a refractive index higher, for example 2.65, for optical efficiency under both wet and dry conditions. This is because the relative refractive index of the microspheres will drop when wet, so that under dry conditions the 1.9 index microspheres will be most efficient, while the higher index microspheres will be more efficient under wet conditions.

Retroreflective articles of the invention may be prepared in the following manner. A specular reflecting layer is prepared by coating a solution containing a specular reflecting pigment such as leafing aluminum pigment, pearlescent pigments, mica, nacreous pigments, or other specular reflecting pigments, in a light-transmissive medium onto a film or carrier of some type. The film can ultimately be left attached to the binder to become a permanent part of the retroreflective article if desired. Alternatively, the reflecting layers may be coated directly onto a structured surface, such as a patterned pavement marking or a curb. The pigment is dispersed into a suitable medium, for example with an air mixer, taking care not to expose the flakes to high shear so as to maintain their integrity. It is important for the specular reflecting pigment to be in a light-transmissive coating medium so that light entering the retroreflective article is not absorbed but is instead retroreflected. Other important properties for this medium include durability for intended use, ability to keep the pigment particles suspended, coating ability, and adequate wetting and microsphere adhesion. For ease of coating, the medium will preferably be a liquid with a viscosity of less than 10,000 centipoise at coating temperature. Vinyls, acrylics, epoxies, and urethanes are examples of suitable mediums, although other materials which also possess these properties may also be used. Urethanes, as disclosed in U.S. Pat. No. 4,988,555 (Hedblom), are a preferred medium. The first layer containing a diffusely reflecting pigment such as $TiO_2$ is cast over the second layer. The diffusely reflecting pigment is also dispersed in a light-transmissive medium such as an urethane. It is also important that the medium for the diffusely reflecting pigment possess the same properties important for the specular reflecting pigment medium; namely that the medium be light-transmissive, durable, coatable, possess adequate wetting and microsphere adhesion properties, and keep the pigment particles in suspension.

Coating or application of the two layers of the binder layer is by any suitable means, for example notched bar coating, Myer bar coating, squeeze-roll coating, extrusion, or other metering means.

While the bi-layer coating is still fluid the microspheres are delivered into it. The microspheres may be delivered by any suitable method, for example from a hopper or a fluidized bed. The delivery system is usually equipped with a means to control the number of microspheres applied. If the binder is coated from solvent, some of the solvent may be evaporated prior to placement of the microspheres in order to control the depth of embedment. Alternatively, excess solvent may be evaporated after microsphere deposition. The depth of embedment, or sink, of the microsphere is controlled through a combination of the relationship between surface energy of the microspheres and surface tension of the coating, and the viscosity of the fluid coating. If the surface energy of the microsphere is chosen appropriately with respect to the surface tension of the fluid coating, the microsphere will tend to float and not sink entirely into the coating. The surface energy of the microsphere may be altered by various surface treatments, such as the use of surfactants. The rheology, e.g., viscosity and other flow characteristics of the coating may be controlled, for example through heating, solvent content, addition of thickeners, selection of composition, or addition of fillers.

By controlling the surface energy of the microsphere and the rheology of the coating, the manner in which the binder material draws up around the microspheres is controlled. Capillation is the term used to describe the slight wicking action of the binder material around the microsphere. This capillation is important because the binder material forms a socket-like structure around the microsphere and holds it in place. As the binder material hardens as by cooling, loss of solvent or other volatiles, or by chemical reaction such as cross-linking or polymerization, the microsphere is held in place.

Capillation is also important for optical efficiency, as it is an efficient means to achieve microsphere embedment, by bringing more of the microsphere in contact with the coating, allowing for a more efficient use of the diffusely reflecting optics. The same effect could be obtained without capillation by having the binder layer be straight across between microspheres, however this would require more binder layer material. The key point is that the contact angle between the binder layer and the microsphere not be greater than 90°, as less of the microsphere will then be in contact with the binder layer, decreasing the optical efficiency. Care must be taken so there is not an excessive amount of capillation, as the microsphere will then be on a pedestal and will be more likely to break free of the binder material. The amount of capillation will depend on the medium chosen for the binder layer.

With any capillation that occurs taken into account, the microspheres are embedded on average into the binder to a depth of approximately 50 to 55 percent of their average diameter. The critical parameter is the depth of embedment; whether the depth is obtained through the sink of the microsphere or through capillation is less important. The microspheres become partially embedded in the specular layer (second layer) of the binder material. While it is important that the microsphere not be sunk deeply into the specular layer as this will decrease the portion of the microsphere in contact with the diffusely reflecting layer, a small amount of sink into the specular layer is desirable to increase the efficiency of the specular optics. The extent to which the microsphere is sunk into the second layer will determine the portion of the microsphere which will utilize the specular reflectance. This portion of the microsphere will then not be available for diffuse reflection. The aperture, or region around the point at the bottom of the sphere that is in contact with the second layer is typically in the region of approximately 0.5 radians for maximum optical efficiency.

FIG. 4 is a schematic diagram of the retroreflective article 41 of the invention, depicting the various layers. The microspheres 42 are dropped onto the diffusely reflective layer 43 of the binder layer, becoming partially embedded in the specularly reflective layer 44 of the binder layer. The binder layer in this embodiment has been coated on a film or carrier 45, and an adhesive 46 applied to the opposite side of the film. This flat sheet embodiment of the invention may be applied to a contoured or structured surface in order to provide a vertical component. Alternatively, the flat sheet embodiment may be applied directly to a rough road surface. The high points and valleys of the road surface may be sufficient to provide the necessary vertical component.

The retroreflective article of the invention displays brightness over a large range of entrance angles and therefore distances. Due to the verticality of the retroreflective article, incident light at a given distance will utilize the diffusely reflective component of some microspheres and the specularly reflective component of others. As the light source moves closer, the specular reflectance of the other microspheres (those higher on the vertical element) will come into play, while other microspheres will now utilize the diffusely reflecting layer. (see FIG. 5)

The angles of entering light therefore determine where the light will be refracted to, and thus which type of pigment will be utilized. The retroreflective element of this invention enables improved levels of retroreflection over a much wider range of entrance angles than does a retroreflective element utilizing only one type of reflecting pigment. (see FIG. 7)

The reflectivity values for the dual reflector of Example 1, along with the values for only diffuse reflectors, and only specular reflectors, are shown in Table 1.

TABLE 1

| ENTRANCE ANGLE | DIFFUSE REFLECTOR | SPECULAR REFLECTOR | DUAL REFLECTOR |
|---|---|---|---|
| 0 | 3.94 | 65.96 | 64.50 |
| 5 | 2.637 | 64.78 | 59.57 |
| 10 | 2.653 | 58.08 | 51.11 |
| 15 | 2.681 | 49.6 | 34.09 |
| 20 | 2.75 | 43.62 | 15.75 |
| 25 | 2.836 | 39.49 | 7.57 |
| 30 | 2.927 | 36.26 | 5.1 |

TABLE 1-continued

| ENTRANCE ANGLE | DIFFUSE REFLECTOR | SPECULAR REFLECTOR | DUAL REFLECTOR |
|---|---|---|---|
| 35 | 3.01 | 31.15 | 4.11 |
| 40 | 3.054 | 26.01 | 3.58 |
| 45 | 3.068 | 20.73 | 2.98 |
| 50 | 3.003 | 16.54 | 2.41 |
| 55 | 2.857 | 14.03 | 2.45 |
| 60 | 2.633 | 12.06 | 2.4 |
| 65 | 2.354 | 9.2 | 2.25 |
| 70 | 2.086 | 5.23 | 2.1 |
| 75 | 1.891 | 2.08 | 1.8 |
| 80 | 1.822 | 0.464 | 1.79 |
| 85 | 1.932 | 0.0365 | 1.85 |
| 90 | 0 | 0 | 0 |

In a particularly preferred embodiment of the invention the microspheres are ceramic with a 1.9 index of refraction, the diffusely reflecting pigment is titanium dioxide, and the specularly reflecting pigment is leafing aluminum. The surface to which the binder layer coatings are applied is a patterned pavement marking.

In another preferred embodiment the coating is applied to a flat tape which is then applied to a 2-dimensional (2-d) or 3-dimensional (3-d) object such as a barrel or post. Alternatively, the coating may be applied directly to a 2-d or 3-d object.

In another preferred embodiment, a filament may be coated with a solution containing the specularly reflecting pigment. The filament may be made of any suitable material. In a particularly preferred embodiment, the filament is fiberglass. The solution containing the diffusely reflecting pigment may then be coated over the specularly reflecting layer, and the microspheres applied by suitable means, such as by a fluidized bed. The filament may then be chopped into segments of the desired length. Alternatively, the microspheres may be applied after the filament is chopped into segments of the desired length. These elements may then be applied to a paint, film, or other suitable substrate to form a retroreflective article. The wide angularity of elements means no orientation of the retroreflective element is required.

In another preferred embodiment, the filament, such as a thermoplastic, may already contain the specularly reflective pigment throughout the filament. The diffusely reflective layer is then applied to the filament. Alternatively, the reflective layers may be co-extruded with the filament.

In another embodiment of the invention, a pellet of any suitable material, such as fiberglass or a thermoplastic resin, is coated with a specularly reflective layer. The diffusely reflective layer is then coated over the specularly reflective layer. Alternatively, the pellets may contain the specularly reflective pigment throughout the pellet. Microspheres are applied to the coated pellet. These coated pellets may be applied to a paint, film, or other suitable substrate to form a retroreflective article.

It is preferable to have at least a slight vertical component to the retroreflective article made from the retroreflective elements of the invention. This is so that the specular reflective pigments will come into utilization. Also, with a vertical component, rain will run off the retroreflective article instead of pooling and decreasing reflectivity. (See FIG. 6 wherein 61 is an embodiment of the invention, 62 is a microsphere, 63 is the binder layer containing the diffusely reflecting pigment, 64 is the binder layer containing specular reflecting pigment, and 65 is a substrate with the vertical component.)

The film to which the binder coating and microspheres may optionally be applied may subsequently have an adhesive applied to the opposite side. The resulting film may then be adhered to a structured surface to form a retroreflective article.

EXAMPLES

The invention will be further explained by the following illustrative examples which are intended to be non-limiting. Unless otherwise indicated, all amounts are expressed in parts by weight.

Unless otherwise indicated, the following test methods were used: ASTM D4061-81 Retroreflectance of Horizontal Coatings, ASTM E284 Terminology of Appearance, ASTM E808 Practice for Describing Retroreflectance, ASTM E809 Practice for measuring Photometric Characteristics of Retroreflectors.

Example 1

A dispersion of approximately 5 percent by weight of leafing aluminum pigment in polyurethane was prepared by air mixing the pigment into the resin. The resulting dispersion was then coated onto an aluminum foil at a wet coating thickness of approximately 125 micrometers (μm). When this layer was partially dried, a second solution of approximately 20 percent by weight $TiO_2$ in acrylic resin was coated on top of the aluminum pigment layer, also at a wet coating thickness of approximately 125 μm. While the bi-layer binder coating was still fluid, glass microspheres of 1.9 index of refraction with an average diameter of approximately 200 micrometers were dropped onto the coating. The microspheres were applied at a density of approximately 80 grams per square meter. The viscosity of the binder layer was controlled through the application of heat so that the microspheres became embedded to a depth of approximately 50 to 55 percent of their average diameter upon complete drying of the binder layer. The aluminum foil remained a part of the final article.

Example 2

The article of this example is the same as that of Example 1 except that the carrier used was a silicone release liner, which was discarded when the binder material had cured, so that the carrier did not remain a part of the final article.

Example 3

The article of the first example where a pressure-sensitive adhesive was applied to the opposite side of the aluminum foil that had previously been coated with binder layer and microspheres.

Example 4

The article of the third example where the film with binder and microspheres on one side and adhesive on the other is adhered to a structure to form a pavement marking.

Example 5

In this example, a plastic filament of diameter approximately 1000 μm was coated with a solution containing 5 percent by weight specularly reflecting aluminum flake. Over this layer was coated a solution containing 20 percent by weight diffusely reflective titanium dioxide. While this bi-layer binder coating was still fluid, ceramic microspheres with a refractive index of 1.9 and an average diameter of approximately 200 μm were applied to the coating. The filament was then chopped into segments of the desired length. These segments were then applied to a paint in order to form a reflective article.

Example 6

Articles made by embedding the microspheres to varying depths in the specular reflecting layer.

Example 7

Articles made with the same beads, with each pigment alone and then with both types of pigments together.

Various modifications and alterations of this invention will become apparent to those skilled in the art without departing from the scope and spirit of this invention.

What is claimed is:

1. A method of making a retroreflective article comprising the steps of:
   1) providing a specularly reflective fluid layer comprising a specular reflector pigment in a polymeric medium, said layer having first and second sides;
   2) applying a diffusely reflective fluid layer comprising a diffuse reflector pigment in a polymeric medium, said layer having first and second sides, over one side of the specularly reflective layer yielding a fluid bi-layer; and
   3) depositing microspheres onto the fluid bi-layer, allowing said microspheres to sink through the diffusely reflective layer and become partially embedded in the specularly reflective layer.

2. A method according to claim 1 further comprising 4) providing a film having first and second sides onto the first side of which the bi-layer and microspheres are applied.

3. A method according to claim 2 further comprising 5) laminating an adhesive to the second side of the film.

4. A method according to claim 3 further comprising 6) laminating the second side of the film with adhesive thereon to a contoured surface.

5. A method according to claim 1 further comprising 4) heating said bi-layer to control the rheology thereof.

6. A method according to claim 1 wherein the microsphere has a surface energy and the bi-layer has a rheology such that the bi-layer draws up around the microsphere.

7. A method of making a retroreflective article comprising the steps of:
   1) applying a specularly reflective fluid layer comprising a specular reflector pigment in a polymeric medium, said layer having first and second sides, onto a single or multiple thread or filament;
   2) applying a diffusely reflective fluid layer comprising a diffuse reflector pigment in a polymeric medium, said layer having first and second sides, over the specularly reflective layer yielding a fluid bi-layer;
   3) depositing microspheres onto the fluid bi-layer, allowing said microspheres to sink through the diffusely reflective layer and become partially embedded in the specularly reflective layer;
   4) after solidification of the bi-layer, cutting the filament into small sections; and
   5) depositing these small sections onto a substrate.

8. A method of making a retroreflective article comprising the steps of:
   1) applying a specularly reflective fluid layer comprising a specular reflector pigment in a polymeric medium, said layer having first and second sides, onto a single or multiple thread or filament;

2) applying a diffusely reflective fluid layer comprising a diffuse reflector pigment in a polymeric medium, said layer having first and second sides, over the specularly reflective layer yielding a fluid bi-layer;

3) cutting the thread or filament into small sections;

4) depositing microspheres onto the fluid bi-layer of the small sections, allowing said microspheres to sink through the diffusely reflective layer and become partially embedded in the specularly reflective layer;

5) allowing the bi-layer to solidify; and 6) depositing these small sections onto a substrate.

9. A method of making a retroreflective article comprising the steps of:

1) applying a diffusely reflective fluid layer comprising a diffuse reflector pigment in a polymeric medium, said layer having first and second sides, onto a single or multiple thread or filament, wherein said thread or filament comprises a specularly reflective pigment, yielding a fluid bi-layer;

2) depositing microspheres onto the fluid bi-layer, allowing said microspheres to sink through the diffusely reflective layer and become partially embedded in the thread or filament comprising the specularly reflective pigment;

3) after solidification of the bi-layer, cutting the thread or filament into small sections; and 4) depositing these small sections onto a substrate.

10. A method of making a retroreflective article comprising the steps of:

1) applying a diffusely reflective fluid layer comprising a diffuse reflector pigment in a polymeric medium, said layer having first and second sides, onto a single or multiple thread or filament, wherein said thread or filament comprises a specularly reflective pigment yielding a fluid bi-layer;

2) cutting the thread or filament into small sections;

3) depositing microspheres onto the fluid bi-layer of the small sections, allowing said microspheres to sink through the diffusely reflective layer and become partially embedded in the thread or filament comprising the specularly reflective pigment;

4) allowing the bi-layer to solidify; and 5) depositing these small sections of thread or filament onto a substrate.

11. A method of making a retroreflective article comprising the steps of:

1) applying a specularly reflective fluid layer comprising a specular reflector pigment in a polymeric medium, said layer having first and second sides, onto a pellet;

2) applying a diffusely reflective fluid layer comprising a diffuse reflector pigment in a polymeric medium, said layer having first and second sides, over the specularly reflective layer yielding a fluid bi-layer;

3) depositing microspheres onto the fluid bi-layer, allowing said microspheres to sink through the diffusely reflective layer and become partially embedded in the specularly reflective layer;

4) allowing the bi-layer to solidify; and 5) depositing these pellets onto a substrate.

12. A method of making retroreflective article comprising the steps of:

1) applying a diffusely reflective fluid layer comprising a diffuse reflector pigment in a polymeric medium, said layer having first and second sides, onto a pellet, wherein said pellet comprises a specularly reflective pigment yielding a fluid bi-layer;

2) depositing microspheres onto the fluid bi-layer, allowing said microspheres, to sink through the diffusely reflective layer and become partially embedded in the pellet comprising the specularly reflective pigment;

3) allowing the bi-layer to solidify; and 4) depositing these pellets onto a substrate.

* * * * *